(No Model.)

G. H. CROSBY.
TRAP FOR STEAM PRESSURE GAGES.

No. 297,504. Patented Apr. 22, 1884.

Witnesses:
S. N. Piper
E. B. Pratt

Inventor:
Geo. Hannibal Crosby
by R. H. Eddy atty

N. PETERS. Photo-Lithographer, Washington, D. C.

UNITED STATES PATENT OFFICE.

GEORGE HANNIBAL CROSBY, OF SOMERVILLE, MASSACHUSETTS.

TRAP FOR STEAM-PRESSURE GAGES.

SPECIFICATION forming part of Letters Patent No. 297,504, dated April 22, 1884.

Application filed December 3, 1883. (No model.)

*To all whom it may concern:*

Be it known that I, GEORGE HANNIBAL CROSBY, of Somerville, in the county of Middlesex, of the Commonwealth of Massachusetts, have invented a new and useful Improvement in Traps for Steam-Pressure Gages; and I do hereby declare the same to be described in the following specification and represented in the accompanying drawings, of which—

Figure 1:
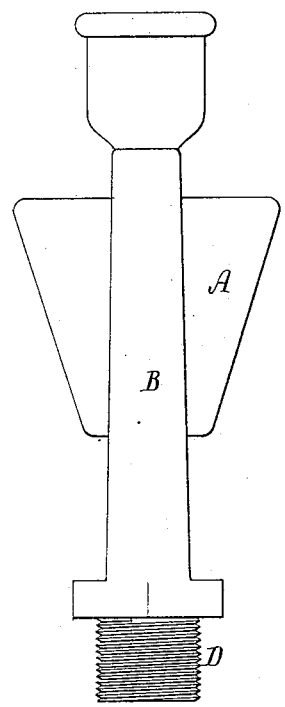
Figure 2:
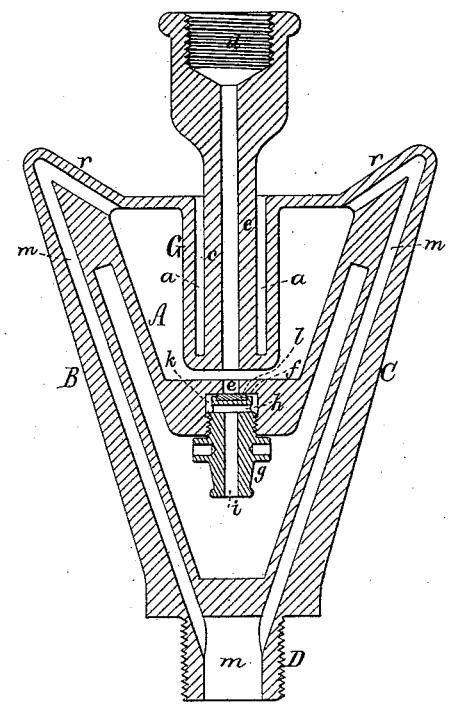

Figure 1 is a front elevation, and Fig. 2 a vertical and longitudinal section, of a trap containing my present invention, the nature of which is defined in the claims hereinafter presented.

The trap shown in the said drawings is analogous to that for which I have recently applied for a patent, the application being numbered 109,235, and having been allowed on October 6, 1883, my improvement being for the purpose of insulating the eduction-pipe from the steam-condensing vase or water-holder in a manner to not only expose the outer surface of such pipe, but more of the vase or condenser to the atmosphere, in order to prevent the water in the vase or holder from being reconverted into steam by the steam of the induct or heat from the boiler.

This trap is for use with a steam-pressure gage, and is to prevent the steam from a boiler from entering the curved expansive tube of the gage, though causing water to be forced therein, it being well known that the steam injures the expansive tube, or makes it erroneously act to indicate the pressure of steam.

In this trap, A is the steam-condensing vase or water-holder, having extended down within it a tube, c, provided at its upper part with an internally-screw-threaded mouth, d, to fit it to the induct of a steam-pressure gage. The tube c opens at its lower end into the vase or water-holder, and projects upward from the bottom of a chamber, a, that surrounds the tube, and is open at the top of the vase, such chamber being formed within and by a cylindrical cup, G, extending downward within the vase from its top, as represented. This vase, through its bottom, has a hole, e, there being at the lower end of such hole a valve-seat, f. A plug, g, provided with passages h and i, arranged in it, as shown, is screwed upward within the bottom of the vase, and into a chamber, R, below the valve-seat, such plug serving to press a disk-valve, l, upward against the seat. On unscrewing the plug any water that may be in the vase may be discharged therefrom through the hole e and the passages h and i. The plug and valve and the hole and valve-seat constitute a cock for discharge of such water. For such, an ordinary cock screwed into the bottom of the vase might be substituted. The vase thus made is supported by two bent arms, B and C, extending, as shown, from the body and downward to a screw, D, for connecting a trap to a steam-boiler or a conduit leading therefrom. The screw has a hole or passage, m, extending through it and one or each of the arms and into the interior of the vase. Each arm, B or C, has its shorter or upper portion, r, inclined downward to the body of the vase, as shown. This feature is important, because in such case the said part r of the arm holds, in practice, with the vase, water and thus aids in preventing vaporization of the water in the vase by the steam.

If we suppose the trap to be properly applied to a steam-pressure gage and an induct for supplying steam to the trap, the steam on passing through the passage m into the vase will be condensed therein about the cup G, and also in the upper inclined part, r, of each arm. Water thus produced in the vase will by the steam be driven up the tube or educt c into the expansive tube of the pressure-gage.

By means of the open insulating chamber or space a the water in the vase or holder will be insulated from the outer surface of the educt c, which, with the next adjacent or interior surface of the cup G, will be exposed to the atmosphere, whereby the chance of the water in the base being reconverted into steam will be greatly lessened, if not entirely removed, and the heat from the boiler be cut off.

I claim—

1. In the steam-pressure-gage trap, the combination of an open insulating chamber or space, a, arranged between the eduction-pipe c and the vase or water-holder, with such pipe and said vase or holder, such space or chamber being for the purpose as set forth.

2. The improved gage-trap, substantially as described, consisting not only of the vase or water-holder A, the connection-screw D, and bent arms B and C, arranged and provided with a passage, $m$, leading through such screw and one or each of the said arms and into the upper part of the vase, but of the eduction-tube $c$, and the insulating-cup G, open at top, and arranged in the vase, all being substantially as set forth.

GEORGE HANNIBAL CROSBY.

Witnesses:
R. H. EDDY,
E. B. PRATT.